United States Patent
Jain et al.

(10) Patent No.: US 12,301,587 B1
(45) Date of Patent: May 13, 2025

(54) AUTOMATIC ASSESSMENT OF POTENTIALLY MALICIOUS WEB CONTENT VIA WEB PAGE INVESTIGATOR

(71) Applicant: Lookout, Inc., Boston, MA (US)

(72) Inventors: Akshat Jain, Calgary (CA); Agnit Sarkar, Bangalore (IN); Smit Davda, Rajkot (IN); Fatin Haque, Kitchener (CA); Tyler Croak, Columbia, MD (US); Brian Buck, Livermore, CA (US); Pritesh Kasliwal, Apex, NC (US)

(73) Assignee: Lookout, Inc., Boston, MA (US)

( * ) Notice: Subject to any disclaimer, the term of this patent is extended or adjusted under 35 U.S.C. 154(b) by 0 days.

(21) Appl. No.: 18/664,119

(22) Filed: May 14, 2024

(51) Int. Cl.
*H04L 9/40* (2022.01)
*G06F 16/958* (2019.01)
*G06K 19/06* (2006.01)

(52) U.S. Cl.
CPC ............ *H04L 63/14* (2013.01); *G06F 16/958* (2019.01); *G06K 19/06037* (2013.01)

(58) Field of Classification Search
CPC .. H04L 63/14; G06F 16/958; G06K 19/06037
USPC ......................................................... 726/22
See application file for complete search history.

(56) References Cited

U.S. PATENT DOCUMENTS

| 8,099,472 B2 | 1/2012 | Mahaffey et al. | |
|---|---|---|---|
| 2013/0001291 A1* | 1/2013 | Ibrahimbegovic | G06K 5/00 235/375 |
| 2020/0262391 A1* | 8/2020 | Pham | H04L 9/3273 |
| 2021/0004463 A1* | 1/2021 | Todasco | G06F 21/565 |
| 2023/0015096 A1* | 1/2023 | Wei | G06K 7/146 |

OTHER PUBLICATIONS

Federal Bureau of Investigation, "Cybercriminals Tampering with QR Codes to Steal Victim Funds," https://www.ic3.gov/Media/Y2022/PSA220118, Jan. 18, 2022.
AO Kaspersky Lab, "QR Code Security: What are QR codes and are they safe to use?," https://usa.kaspersky.com/qr-scanner, 2024.
Al-Zahrani et al., "Secure Real-Time Artificial Intelligence System against Malicious QR Code Links," Hindawi, Security and Communication Networks, vol. 2021, Article ID 5540640, https://doi.org/10.1155/2021/5540670, Dec. 8, 2021.
U.S. Appl. No. 18/295,766.
U.S. Appl. No. 18/471,099.
U.S. Appl. No. 18/486,995.

* cited by examiner

*Primary Examiner* — Jacob Lipman
(74) *Attorney, Agent, or Firm* — Dergosits & Noah LLP; Michael E. Dergosits

(57) ABSTRACT

Methods and systems for annotating and assessing content, including QR codes, using a web page investigator to avoid dangerous scans of such content are described herein. A security module executing on a client device may receive a request for web content. A computer vision model may then scan the requested web content to identify and annotate graphical features on the webpage prior to rendering the web content on a display of the client device. The computer vision model may identify a QR code and transmit information encoded within the QR code to a server executing a phishing and content protection (PCP) engine for analysis. When the identified QR code is indicated to be malicious, the client device may render a modified version of the requested web content to discourage the user from scanning the identified QR code.

20 Claims, 7 Drawing Sheets

AUTOMATIC ASSESSMENT OF POTENTIALLY MALICIOUS WEB CONTENT VIA WEB PAGE INVESTIGATOR

TECHNICAL FIELD

The claimed subject matter relates generally to the field of network communications and more specifically to enhancing network security for individual content items on webpages.

BACKGROUND

Quick-response (QR) codes are extensively deployed by enterprises and small businesses for the customers to go to a web page or to be scanned by a concerned organization for authentication (e.g. airplane boarding passes). However, cybercriminals use malicious QR codes to trick users into visiting malicious websites (i.e. QR codes that direct the user to an undesired destination). These malicious QR codes look and appear to be genuine and often mimic legitimate businesses QR codes. A victim who is scanning the QR code may not know that the code scan may take them to a malicious website. Such QR codes may also contain embedded malware that allows hackers to access a victim's smartphone to steal personal information and/or important financial information. The QR codes can be deployed both physically and digitally. Examples of physical QR code include QR codes on restaurant menus, company brochure/visiting card, Billboards etc. Examples of digital QR codes include codes that are emailed, received as a text on cell phone, received from mobile apps, and/or QR codes on webpages directly.

Conventional QR scanner apps with integrated security capabilities exist that warn users about the danger behind a QR code. These integrated QR code applications identify malicious links behind the QR codes and warn the user about the danger of scanning such QR codes. However, these solutions require a user to scan the QR code for the scanner to identify whether the QR code is malicious or not. If the user does not have a code-scanning application with integrated security capabilities, then the QR code can take the user to a malicious website. Additionally, if the user clicks pictures of the QR code and forwards it to someone who does not have a QR code scanner with integrated security capabilities, the recipient can be taken to a malicious website. For digital QR codes, there currently is no solution that exists that proactively tells the user whether a QR code is malicious or not before scanning the code.

SUMMARY

Methods and systems for annotating and assessing graphical features, including QR codes, on web content using a web page investigator to avoid dangerous scans of such graphical features are described herein. A computer vision model (executing on a client device, a server in communication with the client device, or any suitable combination thereof) may receive a request for web content. The computer vision model may be in communication with a client security module also executing on the client device. The computer vision model may then scan a snapshot of the requested web page to identify and annotate graphic features on the web content prior to rendering the web content on a display of the client device. There are several advantages to performing the analysis on a scanned snapshot. There are several conventional techniques available in the art through which a QR code could be examined, such as vector graphic elements, canvas element in HTML, document object model, or a combination thereof. However, by using a snapshot for the scan, the computer vision model can view the QR code within the context it is presented on a device display.

When a QR code is one of the content features on the web content, the computer vision model may identify the QR code among the annotated graphical features and information encoded within the identified QR code may be extracted and transmitted to a phishing and content protection (PCP) engine. In some embodiments, the PCP engine is executed locally on the client device. In other embodiments, the information encoded within the identified QR code may be transmitted via a network connection to a server executing the PCP engine. The PCP engine may provide an indication whether or not the information encoded within the identified QR code is malicious to the security module. When the information encoded within the identified QR code is indicated to be malicious, a modified version of the web content may be rendered on the client device to discourage the user from taking an action based on the information encoded within the identified QR code. For example, a message can be shown on top of the web content that discourages the user from scanning the QR code or accessing the encoded information within (e.g., a URL associated with a malicious web site or web domain). Additionally, the user may be discouraged to forward the QR code to other users, who may not have integrated security capabilities with their QR code scanner provided by the security module and the computer vision model.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

Figure 1:
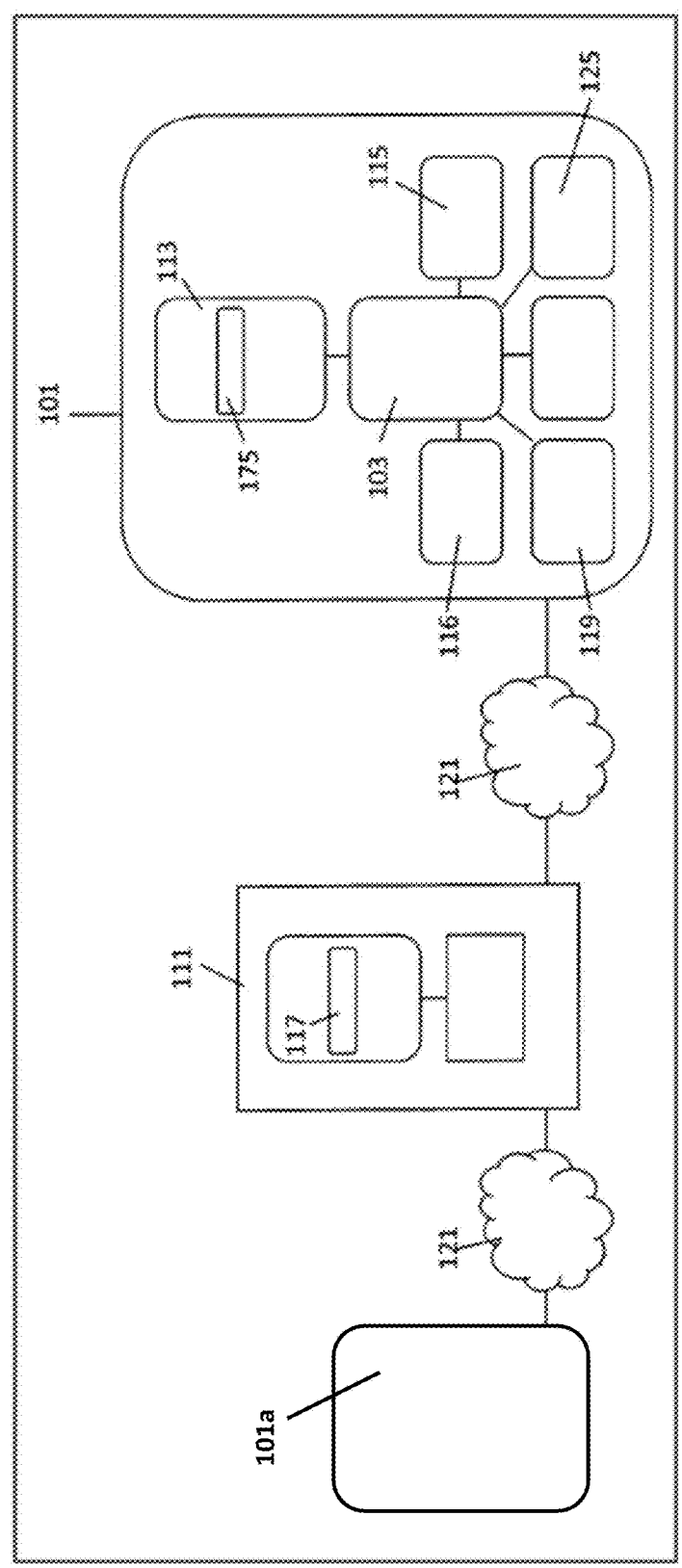
FIG. 1 illustrates a diagram of an example system for enhancing device security with respect to individual content items on webpages in accordance with some embodiments.

To proactively assess content features that may be malicious, such as QR codes, without having to scan or interact with the content features, a web page investigator that collects metadata, including screenshots of web content, may be used to train a computer vision model for classifying maliciousness of web content and extracting additional features for downstream tasks to automatically identify a QR code on the web content. This improves upon conventional solutions, which require manual classification of features on the webpage. In conjunction with the web page investigator, an automated single pixel resolution (pixel-by-pixel) annotator of HTML-rendered features on a webpage for the QR code can be utilized. These annotations can be directly used for training a semantically-aware computer vision model for the extraction of QR codes on a webpage in some embodiments. In other embodiments, image segmentation, or any other conventional technique for identifying QR codes may be used to extract the QR code from the webpage. Once the QR codes have been identified, conventional techniques to identify information encoded within the QR codes (such as URLs encoded within the QR code) may be used to extract the information encoded within the identified QR codes. The information encoded within these QR codes can then be sent to a backend PCP engine for the PCP engine to identify whether the QR code is malicious or not.

By identifying the QR code even before the user scans it, extracting the URL from the QR code, and sending the URL to the PCP engine for classification and identification, the described solutions provide proactive assessment of digital QR codes even before users scan the code to identify malicious QR code. In some embodiments, a database can be created by the PCP engine to track information encoded within the QR codes that have been previously identified as malicious. After classifying these QR codes, a client security module executing on the client device may block the QR codes in several alternative ways. First, when a user aims a camera of their computing device to a known malicious QR code, a URL may be presented to the user to select instead of the QR code. The URL may reference a web site notifying the user that this QR code is malicious. In another embodiment, any webpage investigated containing a QR malicious code that is identified as malicious using a PCP engine may be blocked using the client security module. In yet another embodiment, the client security module may prevent the loading of the QR code image asset on the website when the PCP engine indicates that the QR code may be potentially malicious. In this way, if the user decides to take a picture of malicious QR code to forward it to someone, as soon as the user aims the camera over the QR code, the user will get a message instructing the user to not forward the potentially malicious QR code. Alternatively, as soon as it is identified that the QR code is actually malicious, the client security module can also block user from forwarding the malicious QR code.

The present disclosure may be implemented in numerous ways including, but not limited to, as a process, an apparatus, a system, a device, a method, or a computer readable medium such as a non-transitory computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present disclosure. Applications may also include web applications, which include components that run on the device in a web browser. In this specification, these implementations, or any other form that the disclosure may take, may be referred to as techniques. In general, the order of the steps of disclosed methods may be altered within the scope of the disclosure, except in those instances where it is specified that the order of steps must be in a particular sequence.

As used herein, the term "mobile communications device" may refer to mobile phones, PDAs and smartphones. The term "mobile communications device" may also refer to a class of laptop computers which run an operating system that is also used on mobile phones, PDAs, or smartphones. Such laptop computers are often designed to operate with a continuous connection to a cellular network or to the internet via a wireless link. The term "mobile communications device" excludes other laptop computers, notebook computers, or sub-notebook computers that do not run an operating system that is also used on mobile phones, PDAs, and smartphones. Specifically, mobile communications devices include devices for which wireless communications services such as voice, messaging, data, or other wireless Internet capabilities are a primary function.

As used herein, a "mobile communications device" may also be referred to as a "device," "mobile device," "mobile client," "electronic device," or "handset." However, a person having skill in the art will appreciate that while the present disclosure refers to systems and methods being used on mobile communications devices, the present disclosure may also be used on other computing platforms including, but not limited to, desktop, laptop, notebook, netbook, or server computers.

As used herein, the term "client computer" may refer to any computer, embedded device, mobile device, or other system that can be used to perform the functionality described as being performed by the client computer. Specifically, client computers include devices which can be used to display a user interface by which the functionality provided by the server can be utilized by a user. Client computers may be able to display a web page, load an application, load a widget, or perform other display functionality that allows the client computer to report information from the server to the user and to receive input from the user in order to send requests to the server.

Prior to describing in detail systems and methods for enterprise-level protection of user privacy using a software gateway, a system in which the disclosure may be implemented shall first be described. Those of ordinary skill in the art will appreciate that the elements illustrated in FIG. 1 may vary depending on the system implementation.

As shown in FIG. 1, the system may include mobile communications devices 101, 101a and server 111. An example mobile communications device 101 may include an operating system 113, an input device 115, a radio frequency transceiver(s) 116, a visual display 125, and a battery or power supply 119. Each of these components may be coupled to a central processing unit (CPU) 103. The mobile communications device operating system 113 runs on the CPU 103 and enables interaction between application programs and the mobile communications device hardware components. In some embodiments, the mobile communications device 101 receives data through an RF transceiver(s) 116 which may be able to communicate via various networks including, but not limited to, Bluetooth, local area networks such as Wi-Fi, and cellular networks such as GSM or CDMA.

In some embodiments, a local software component 175 is an application program that is downloaded to a mobile communications device and installed so that it integrates with the operating system 113. Much of the source code for the local software component 175 can be re-used between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. Pat. No. 8,099,472, entitled "SYSTEM AND METHOD FOR A MOBILE CROSS-PLATFORM SOFTWARE SYSTEM," incorporated herein by reference. In another embodiment, the local software component 175 can be device, platform or operating system specific.

The mobile communications device 101 may access a communications network 121 that permits access to a server 111. The server 111 may also be accessed by another mobile communications device 101a via network 121. The network 121 will normally be the Internet but can also be any other communications network. Alternatively, the mobile communications device 101 may access the server 111 by a different network than the network of the other mobile communications device 101a accesses the server 111. In some embodiments, the server 111 is provided with server software 117. The server software 117 on the server 111 provides functionality to allow two-way communication between the server 111 and the mobile communications devices 101, 101a through the network 121. The server software 117 allows data, such as location-related information, pictures, contacts, videos, SMS messages, call history, event logs, and settings to be transferred from the mobile communications device 101 to the other mobile communications device 101a and vice versa.

It is understood by those of ordinary skill in the art that the functionality performed by server 111 does not necessarily have to be accomplished on a single hardware device. In this context, the use of the term server is intended to refer to one or more computers operating in cooperation or collaboration to provide the functionality described herein. The computers may be co-located or in different locations. The computers may inter-operate in such a way that portions of functionality are provided by separate services that may or may not be operated by the same entity as other computers which provide other functionality. For example, one set of servers may provide data storage functionality while another provides all other functionality. The data storage servers may be operated by a separate company than the servers that provide the other functionality. S3 (simple storage system), from Amazon, Inc. is such a data storage service which may be utilized by separate set of computers to enable the present invention.

It should be understood that the arrangement of electronic mobile communications device 101 illustrated in FIG. 1 is but one possible implementation and that other arrangements are possible. It should also be understood that the various system components defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile communications device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the disclosure described herein can be embodied in many different variations, and all such variations known to those of ordinary skill are contemplated to be within the scope of what is claimed.

In the description that follows, the disclosure will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the disclosure is being described in the foregoing context, it is not meant to be limiting as those of skill in the art will appreciate that various of the acts and operation described hereinafter may also be implemented in hardware.

Figure 2:
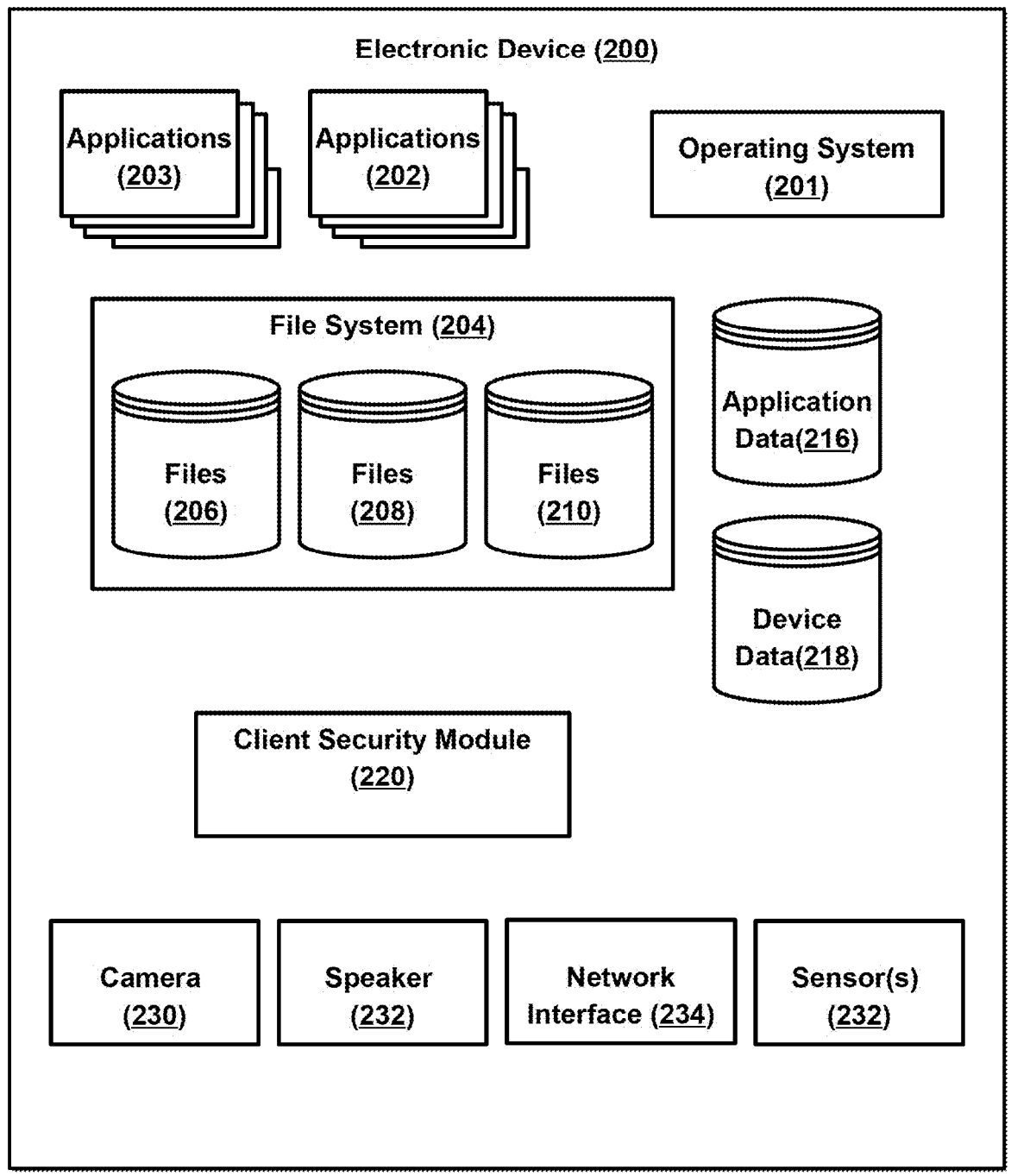
FIG. 2 illustrates a block diagram of an electronic device in accordance with some embodiments of the disclosure.

FIG. 2 illustrates a block diagram of an electronic device 200 in accordance with some embodiments of the disclosure. As shown in FIG. 2, the electronic device 200 may be configured to provide an execution environment to host at least one operating system 201, a plurality of applications 202 and 203, and a file system 204. In some embodiments, each of the plurality of applications 202 and 203 may include executable code, which when executed by a processor (e.g., CPU 103), may provide a service or function of the electronic device 200. Each of the plurality of applications 202 or 203 may be associated with at least a part of the application data 216.

In the same or alternative embodiments, one or more of the plurality of applications 202 or 203 may access any of the file system 204 comprising file sources 206, 208, and 210, application data 216, device data 218, camera 230, speaker 232, network interface 234, and sensor(s) 232. For example, the electronic device 200 may host or run a plurality of applications 202 and 203. A first application may access or retrieve data from application data 216 and file source 206 from the file system 204. A second application may access or retrieve data from the device data 218 and file sources 208 and 210 from the file system 204. Furthermore, a third application may retrieve data generated from the camera 230 and sensor(s) 232 and access the network interface 234. As such, each of the applications of the plurality of applications 202 and 203 may access various types of data or files stored on the electronic device 200 as well as a functionality (e.g., camera 230, speaker 232, network interface 234, sensor(s) 232) of the electronic device 200. In some embodiments, the electronic device 200 may also support the operation of a client security module 220 that may be responsible for creating and implementing policies for the electronic device 200. In some embodiments, the client security module 220 may operate in the electronic device 200 as a client application hosted by the electronic device 200, as is shown in FIG. 2. In an alternative embodiment, the client security module 220 may be provided by and integrated within the operating system 201 of the electronic device 200 using a root directory and/or having root privileges to the operating system 201. In either of the embodiments, the client security module 220 may be configured to manage the creating and applying of policies, including use of a trained computer vision model, to identified content, such as QR codes, described herein. In another embodiment, the client security module 220 may operate on a server in communication with the electronic device 200.

Figure 3:
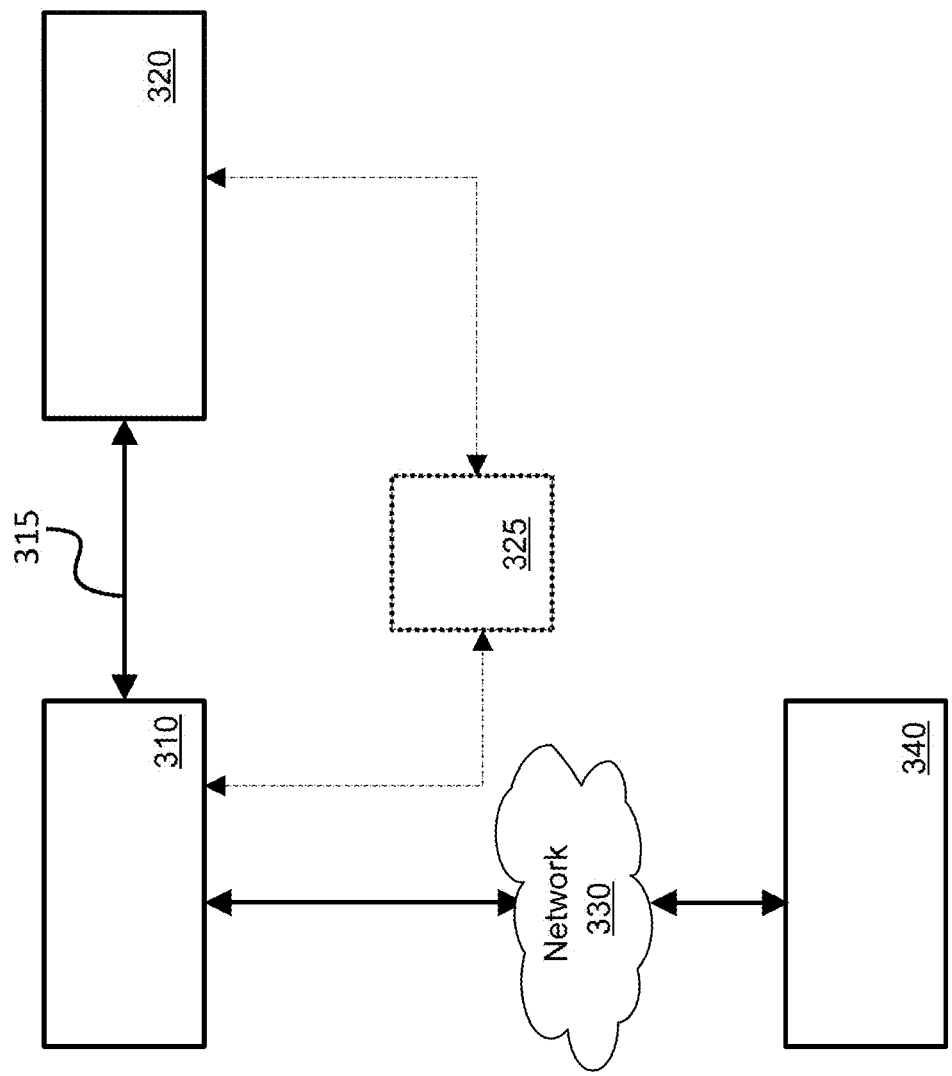
FIG. 3 illustrates a block diagram of a system for enhancing network security for graphical features within web content in accordance with some embodiments.
Figure 4:
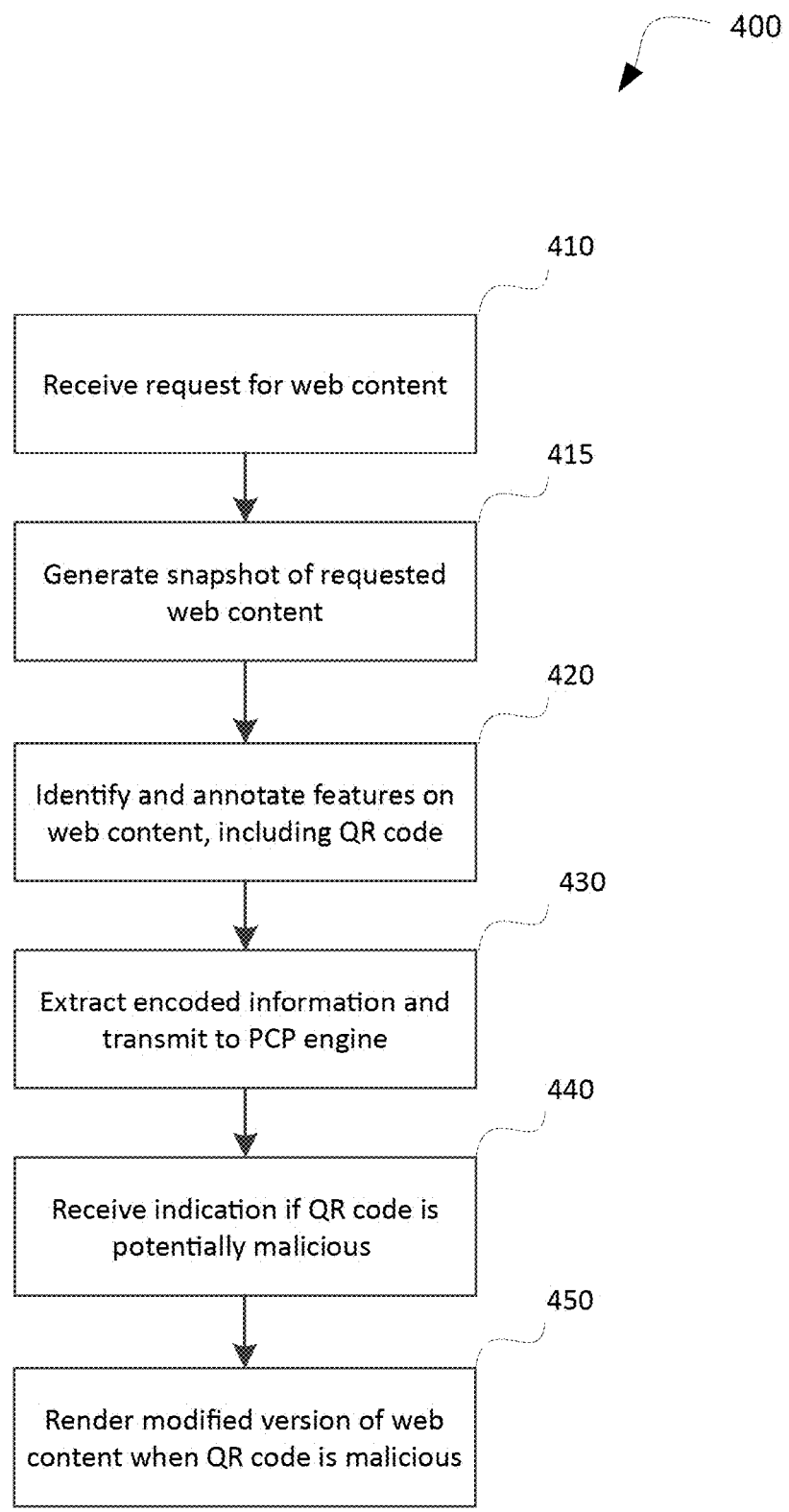
FIG. 4 illustrates a flow diagram of an example method of providing enhanced security regarding QR codes within web content in accordance with some embodiments.

FIG. 3 illustrates a block diagram of a system 300 for enhancing network security for individual graphical features within retrieved web content in accordance with some embodiments. FIG. 4 illustrates a flow diagram of an example method 400 of providing enhanced security regarding QR codes within web content in accordance with some embodiments. Web content, as referred to herein, may refer to any displayable interfaces on a computing device display, including web pages, e-mail messages, web application interfaces, and the like. While embodiments below may refer to analysis of screenshots of web pages, the invention is not limited in this regard, as any of the methods and systems described below may operate on e-mail messages, or any other suitable form of web content. The exemplary system 300 includes a client device 310 in communication with PCP engine server 320 over network connection 315, where the PCP engine is executed on the PCP engine server 320. The client device may request web content, such as web pages, from content source 340 via network 330. The web pages include content features, which may be identified by a security client running on the client device 310 as described below. The content features may be transmitted to the PCP engine server 320 using network connection 315 for analysis. The security client, also referred to herein as a web page investigator, may be a web page/site crawler implemented as an application or agent executing on the client device that is able to examine web content and identify graphical features located therein.

PCP engine server 320 may act as a detector of malicious content features on web pages for one or more client devices 310, regardless of the client devices being remote to any local network (including SWG server 320). This is a significant improvement to conventional firewall technologies, which act only to filter network communications by devices on the same local network as the firewall. For identifying malicious content features, the PCP engine can use available open-source databases used for selecting and blocking ads. Additionally, the database of malicious content (such as information encoded within QR codes, audio/video content, and the like) used by a conventional Secure Web Gateway (SWG as known in the art) can also be developed as proprietary or can be bought from other vendors. The PCP engine may determine, based on the domain or URL associated with the identified QR code, falls into one or more categories of malicious end points (e.g., a phishing site, a malware site, any undesired content, etc.) or includes malicious content. Undesired content may include any content that has been previously indicated by a user or administrator (of an enterprise associated with the client device) as against a security policy or as part of setting security settings for the security module. When the received URL associated with the identified QR code matches an entry on a list of malicious end points, the PCP engine may generate a message stating that the URL is invalid to access. When the received URL does not match any entries on the list of malicious end points, the PCP engine may perform standard DNS resolution to return the requested data to the client device.

In some embodiments, communications between the client device 310 and the PCP engine server 320 may be facilitated by a software gateway executing on software gateway server 325. The software gateway may be implemented as a transparent software gateway running on the PCP engine server 320, or on a separate server 330 altogether in various embodiments. The software gateway server 330 may be used to augment the information provided by the PCP engine server 320, in ways that are elaborated further below.

The method 400 of FIG. 4 for annotating and assessing content, including QR codes, on web pages may start at step 410, where a client security module executing on the client device 310 (e.g., client security module 220) may receive a request for a web page. The request may be received via another application executing on the client device 310, for example, and intercepted by the client security module 220 before being transmitted to the content source 340. At step 415, a snapshot may be taken of the requested web page by the security module. The snapshot may be generated by the security module loading the requested web page and generating an image of the requested web page at a predetermined resolution. At step 420, a computer vision model in communication with the security module may then scan the snapshot of the requested web page to identify and annotate graphical features on the webpage prior to rendering the web page on a display of the client device, in accordance with how the computer vision model was trained using the training data set.

The computer vision model may use a machine learning model trained on a data set of malicious links (also known as digital identifiers) that were previously identified as fraudulent. The data set of such malicious or suspicious links can be collected by human experts, machine learning models or a combination thereof. The digital identifiers, such as webpage links and URLs encoded under the graphical features (such as QR codes) of a webpage can be identified as being fraudulent or by with the help of PCP Engine as described in the U.S. patent application Ser. No. 18/295,766, entitled "MACHINE LEARNING SYSTEM FOR AUTOMATED DETECTION OF SUSPICIOUS DIGITAL IDENTIFIERS," U.S. patent application Ser. No. 18/471,099, entitled "SYSTEM FOR AUTOMATED MODEL SELECTION TO FACILITATE DETECTION OF SUSPICIOUS DIGITAL IDENTIFIERS," and U.S. patent application Ser. No. 18/486,995, entitled "SYSTEM FOR GENERATING SAMPLES TO GENERATE MACHINE LEARNING MODELS TO FACILITATE DETECTION OF SUSPICIOUS DIGITAL IDENTIFIERS," each of which are incorporated herein by reference. Graphical features may be defined as any aspect of the web page that may be used by the user to access a different web site or network end point. Examples of content features include QR codes, audio/visual content, HTML links to different web sites, or any other form of HTML-rendered content on a web site. The annotations may be implemented by any form of highlighting or flagging of the content feature, as is described in further detail below. The rendering may be performed by the browser application on the client device, on the PCP engine server using remote browser isolation, or by a combination thereof. For example, when remote browser isolation is used to render the web page, the pixels or vector drawing instructions for the rendered web page may be transmitted via network connection back to the client device for display.

Figure 5:
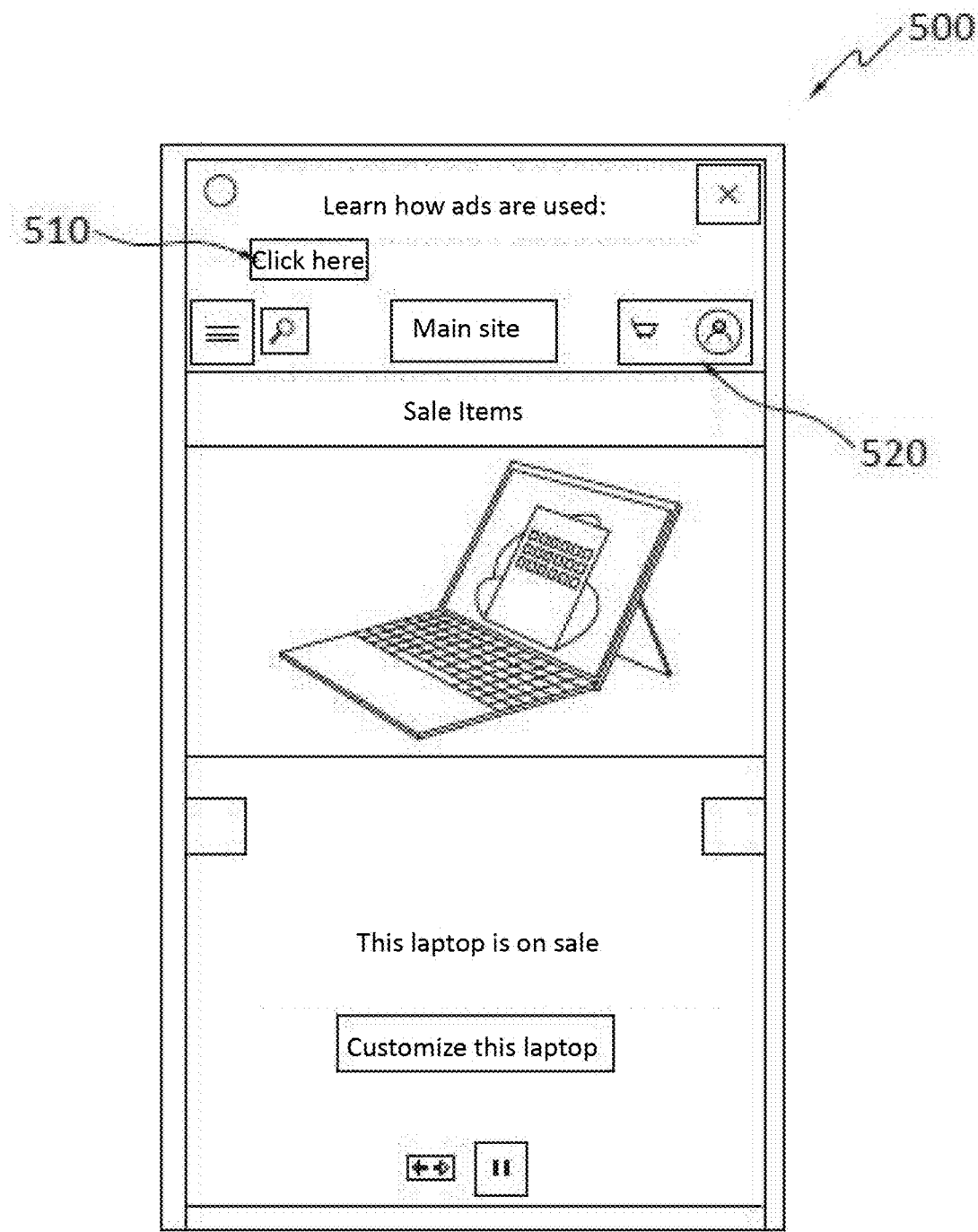
FIG. 5 is a screenshot illustrating annotated graphical features identified on a web page according to one or more embodiments of the disclosure.

FIG. 5 is a screenshot 500 illustrating annotated graphical features identified on a web page according to one or more embodiments of the disclosure. All graphical features which may take a user to a different web page, such as link 510 and selectable button 520, in screenshot 500 have been highlighted by the trained computer vision model after a scan. In some embodiments, after a screenshot is taken by the security module, the annotated graphical features may be classified with a label by the computer vision model indicating the type of content feature that has been annotated (e.g., QR code, button, link, etc.). The rendering of the screenshot used to generate the annotations may be done, for example, by changing the user agents, the viewport, the geolocation, the IP address, and/or via the mobile carrier or ISP through which the client device is connecting to the web page (using certificates, for example). The screenshot may be affected by device display attributes configurable on the client device, such as screen resolution, changes in HTTP headers/address, content coding, and the like.

Returning to method 400, when a QR code is one of the content features on the webpage, information encoded within the identified QR code may be extracted by the security module and transmitted to the PCP engine at step 430. In the exemplary system 300, step 430 includes transmitting the information encoded within the QR code to server 320 via a network connection 315. The information encoded within the QR code may be any reference to another end point (e.g., a URL, a telephone number, an e-mail address, a social media account address, etc. or any other types of undesirable information such as swear words). The security module may convert the annotated graphic feature into a character string using any suitable method (e.g., using an algorithm to decode the encoded information from the QR code or hyperlink). In some embodiments, software gateway server 325 may act as intermediary and receive an identifier of the web page from the client device 310, which is then forwarded to the PCP engine server 320.

In some embodiments, in response to the transmitting the identified QR code to the server executing the PCP engine, the client security module may cause an indicator to be displayed on the requested web page stating that the QR code is currently being resolved by the PCP engine and that the user refrain from scanning the identified QR code until a response is provided by the PCP engine, to provide additional security. To further reduce the risk of impulsive scan or transmission of the QR code during the scanning process, the client security module may blur the QR code until a response is provided by the PCP engine. Furthermore, in some embodiments the client security module may be part of a software gateway client, where requests for web pages are routed to the software gateway server 325. In such embodiments, the software gateway client may cause the indicator and/or the blurring of the QR code during the scanning process.

The PCP engine may use any suitable way of determining whether or not the identified QR code and any other annotated content features are malicious. For example, the indication whether or not the identified QR code is malicious may be determined by the PCP engine comparing the information encoded within the identified QR code to a database of known malicious network-based end points (e.g., website URLs, addresses associated with malicious content such as audiovisual content, etc.). An indication that the identified QR code is malicious may be transmitted to client device 310 when the identified information encoded within the QR code matches an entry in the database of known malicious network-based end points.

Once the PCP engine has made a determination regarding the identified QR code, the result may be transmitted back to the client device 310. For example, when the identified QR code is indicated to be potentially malicious at step 440, the security module 220 on the client module may respond to protect the security of the client device 310. This may take the form, for example, of causing the client device to render a modified version of the web page with a notification message that the identified QR code is likely to be malicious, explaining why the QR code was not rendered. In some embodiments, the identified QR code may be replaced with a modified version of the identified QR on the rendered web page to discourage the user from scanning the identified QR code at step 450. This may be done, for example, by rendering the QR code with an indication that the QR code is a security risk and preventing the QR code from being scannable. The rendered web page may be modified by providing a link to a web site, located where the QR code was supposed to be rendered, for example, to discourage a user from scanning the identified QR code. In other embodiments, the rendered webpage is modified to discourage a user from scanning the identified QR code by blocking access to the requested webpage when the user scans the QR code, preventing the loading of the QR code image asset on the requested web page, or changing the identified QR code (e.g. by overlaying a different graphic) to not be scannable. Other examples of modifications to discourage scanning of the QR code include providing a notification to the client device and/or modification of the QR code itself to refer to a different URL (e.g., the web site that the malicious URL is duplicating to deceive the user). To modify the web page to discourage scanning of the QR code, the PCP engine may need to track malicious variations of legitimate, safe end points. That way, when the URL associated with the QR code is one of the malicious variants, the PCP engine may provide the security module with the legitimate end point the user may desire to access when attempting to scan the QR code.

If the PCP engine has already identified that the URL encoded within the QR code is a malicious link, the URL may be logged by the security module (for example, by adding the URL to a list of malicious URLs cached locally). The next time the security module scans any other QR code and comes across the same malicious URL, the security module will not send it to the PCP engine since that info is already there in the web page investigator cache.

While exemplary method 400 is directed to modifying a rendered web page to discourage scanning of malicious QR codes, the same principles may be applied to any annotated content features. For example, in addition to a QR code, the computer vision model may identify a hyperlink on the web page during the scan of the requested web page. The identified hyperlink may then be transmitted by the client device 310 to the server 320 executing the PCP engine via the network connection 315 prior to rendering the identified hyperlink on a display of the client device 310. In response to the PCP engine comparing the identified hyperlink to a list of known malicious hyperlinks, the PCP engine may send an indication to the client device 310 that the identified hyperlink has a likelihood of linking to malicious content. This can mean that the identified hyperlink matches a known malicious web site, or has characteristics identified by the PCP engine as potentially malicious. When the client device 310 receives the indication that the hyperlink has a likelihood of linking to malicious content, the client device may replace the identified hyperlink with an unselectable indicator stating that there is a potential security problem with the identified hyperlink. Any annotated features having a determined reputation value that is less than the predetermined reputation threshold on the rendered web page may cause the web page to be modified by rendering the annotated feature having the determined reputation value less than the predetermined reputation threshold with an indication that the annotated feature is a security risk and preventing the annotated feature from being selectable.

Figure 6:
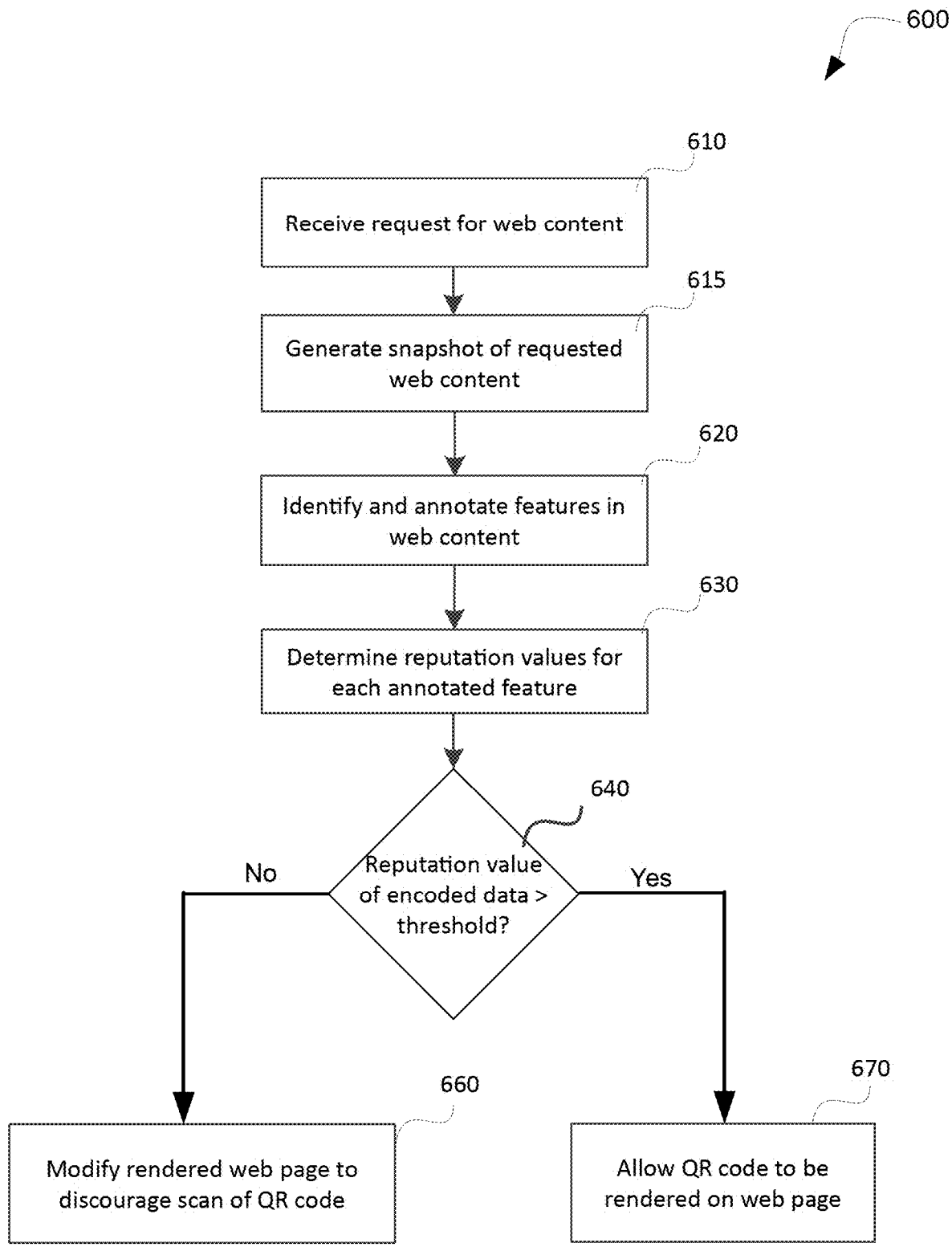
FIG. 6 illustrates a flow diagram of an example method of providing enhanced security regarding content items on webpages in accordance with some embodiments.

In addition to identifying graphic features as being malicious, the PCP engine may include a scoring model trained using training web page data to output a reputation value for encoded information within annotated graphic features in some embodiments. As with the identification and annotation of content features by the computer vision model, the reputation values of each feature in the training web page data may be assigned by data security professionals, or based on a standard database of reputation values. FIG. 6 illustrates a flow diagram of an example method 600 of providing enhanced security regarding content items on webpages in accordance with some embodiments. As in method 400, method 600 may start at step 610 with the security module executing on the client device 310 receiving a request for a web page from a different application running on the client device 310 (e.g., a browser application, or a dedicated application for a specified web site or service). At step 615 a snapshot may be taken of the requested web page by the security module.

Also, as in method 400, at step 620, the computer vision model may then scan the requested web page to identify and annotate graphic features, including one or more QR codes, on the webpage prior to rendering the webpage on a display of the client device, in accordance with how the computer vision model was trained using the training data set. At step 625, information encoded within the annotated graphic features may be extracted and transmitted to the PCP engine to determine if the information is malicious, as is done in method 400.

At step 630, the identified HTML-rendered content features are assigned reputation values based on reputation values associated with each destination web site associated with the individual annotated features. The reputation values may be based on a global rating system or relative to annotated features on the requested web site, according to various embodiments. Examples of assigning reputation values for identified graphical features are described in U.S. patent application Ser. No. 18/295,766, entitled "MACHINE LEARNING SYSTEM FOR AUTOMATED DETECTION OF SUSPICIOUS DIGITAL IDENTIFIERS," U.S. patent application Ser. No. 18/471,099, entitled "SYSTEM FOR AUTOMATED MODEL SELECTION TO FACILITATE DETECTION OF SUSPICIOUS DIGITAL IDENTIFIERS," and U.S. patent application Ser. No. 18/486,995, entitled "SYSTEM FOR GENERATING SAMPLES TO GENERATE MACHINE LEARNING MODELS TO FACILITATE DETECTION OF SUSPICIOUS DIGITAL IDENTIFIERS," each of which are incorporated herein by reference.

For example, a QR code will reference a different web site via a uniform resource locator (URL) associated with the QR code. The reputation value may be based at least in part based on the determination from the PCP engine whether or not the underlying URL associated with the content feature is malicious. The underlying URL will be associated with a reputation value by the PCP engine based on the training data set comprising previously-rated web pages. In some embodiments, the transmitting the information encoded within an identified QR code to the scoring model may be done in response to a determination by the PCP engine that an assigned reputation value of the identified QR code is in a predetermined range of scores where it is unclear if the identified QR code is malicious or not. Reducing the amount of traffic sent to the scoring model may improve system performance, as graphical features associated with known malicious or known safe end points would not need to be sent to the scoring model.

At decision block 640, the computer vision model may compare the determined reputation value of the encoded information associated with the QR code to a predetermined reputation value threshold. When the QR code (or any annotated feature) has a reputation value greater than the reputation threshold, the QR code may be rendered with the rest of the web page on a display of the client device 310 at step 670. However, when the QR code is associated with a reputation value less than the reputation threshold, the identified QR code is modified on the rendered webpage is modified to discourage a user from scanning the identified QR code at step 660. Automatically blocking the graphical feature (e.g., the QR code image) may occur if the reputation value is lower than a predetermined blocking reputation threshold. Blocking may be controlled using a client-controlled threshold or if the PCP engine determines the content feature is malicious, the client security module may block the content feature immediately. This is informing the user that they are "in a bad neighborhood" on this page (i.e., the page itself is not bad, but has links to malicious URLs and that the user should be more careful and cautious.

Figure 7:
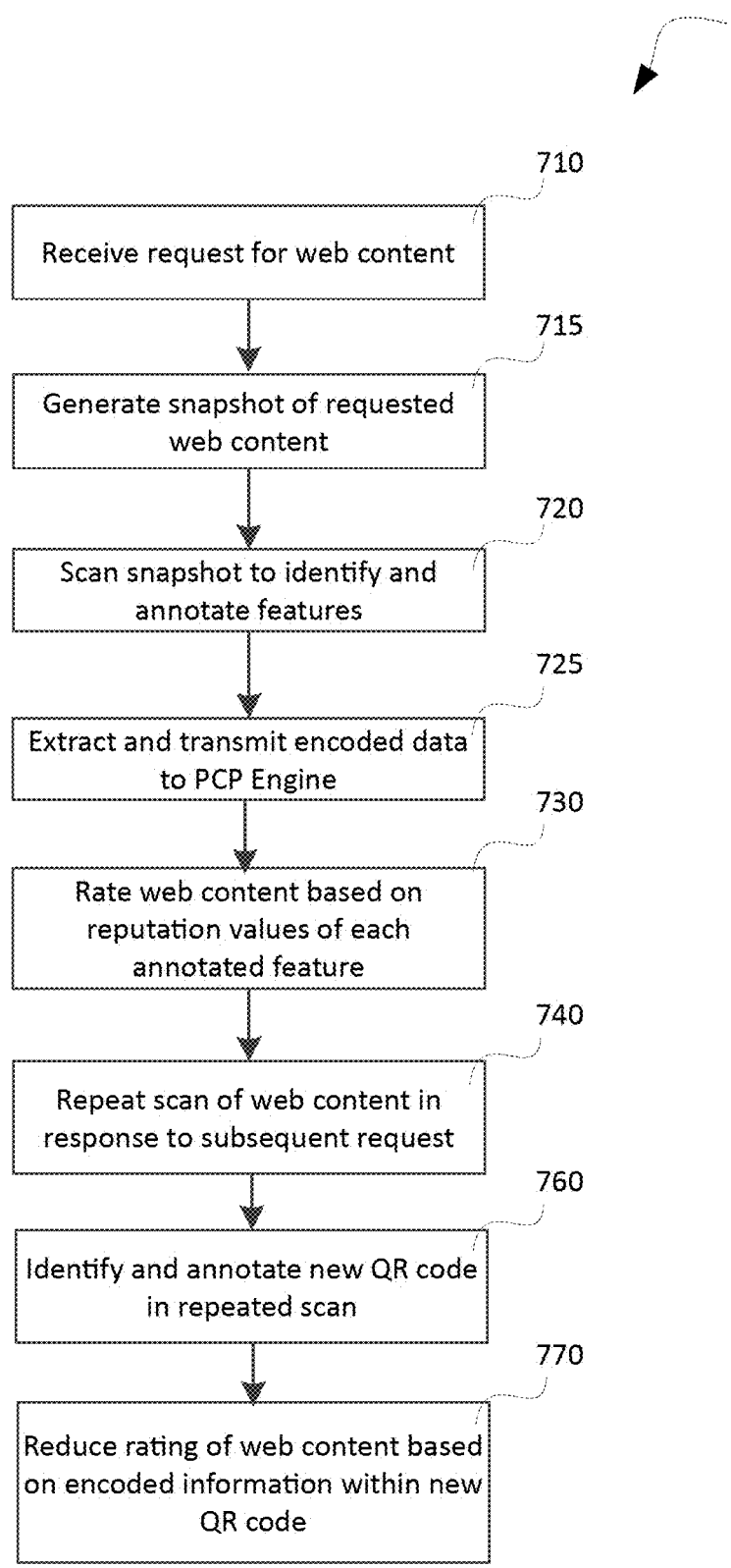
FIG. 7 illustrates a flow diagram of an example method of using a computer vision model to output a reputation score for a received webpage based on content features included in the webpage (including QR codes) in accordance with some embodiments.

While the reputation values may be used to determine if or how a content feature such as a QR code is rendered with the web page, other embodiments go even further, using the reputation values to track and rate web pages as a whole. It is not necessary that the original web page has malicious content in such embodiments. However, when the requested web page subsequently includes content from a third party that has a bad reputation, the reputation of the first party website will be reduced accordingly. FIG. 7 illustrates a flow diagram of an example method 700 of using a computer vision model to output a reputation score for a received webpage based on content features included in the webpage (including QR codes) in accordance with some embodiments. As in method 600, at step 710 the security module executing on the client device 310 may receive a request for a web page from a different application running on the client device 310. A snapshot of the requested web page may be generated by the security module at step 715. The snapshot may then be scanned at step 720 to identify and annotate graphical features on the web page prior to rendering the webpage on a display of the client device. Information encoded within the identified graphical features, including a QR code, may be extracted and transmitted to a PCP engine at step 725.

At step 730, the PCP engine may rate the web page with an overall reputation rating based on an aggregation of the reputation values of the identified features, which may include one or more QR codes. The overall reputation rating may be based on a semantic comparison of the annotated features with reference versions of the annotated features used to generate the reputation values of each annotated feature of the requested web page. The semantic comparison may be between a retrieved version of an annotated content feature obtained in response to the request for the web page and a reference version of the content feature. Semantic comparison is the comparison of meaning between two words, sentences or documents. The PCP engine can use a standard semantic similarity comparison technique (edge-based or node-based) known in the art. The PCP engine can also use commercially available large language models for semantic similarity comparison. The reference version may be retrieved from a trusted source, or may be stored from a previous visit to the web page in various embodiments. The aggregation method used to determine the overall reputation rating may be any suitable method that utilizes the reputation values of the annotated features, including additive aggregation, weighted summing of the reputation values, or using a sum of the reputation values as one of several factors in rating the web page as a whole (e.g., a reputation of the web site associated with the web page, a reputation of an entity associated with the web page, etc.). The rating of the requested web page may then be provided to a user of the client device.

At step 740, the scanning and rating process is repeated in response to a subsequent request for the web page by an application running on client device 310. In the repeated scan, a new feature, such as a new QR code, may be identified and annotated by the computer vision model at step 760. The information encoded within the QR code may be sent to the PCP engine for assessment, and based on the assessment a reputation value for the new QR code may be determined. When the reputation value for the new QR code is less than the predetermined reputation threshold, in addition to modifying the rendered web page to discourage the user from scanning the QR code, the rating of the web page may be reduced at step 770. Reduction of the web page rating may have several consequences. For example, when the overall reputation rating of the web page is reduced below an overall page threshold, the page may be prevented by the client security module from being rendered at all.

Although emphasis has been placed on modifying rendering of web content to discourage accessing potentially malicious content features (including QR codes), the system is not limited in this regard and also may deter forwarding of the potentially malicious content to other users. For example, the client security module may detect an attempt by an application to forward an address of the requested web page to an external destination after determining that the QR code has a reputation value less than the predetermined reputation threshold. In response to detecting the attempt to forward the address, the client security module may generate a message for display on the client device stating that the requested web page includes potentially malicious material. In some embodiments, in addition to generating a warning message, the client security module may actually prevent the application from forwarding the address of the requested web page.

Furthermore, while embodiments above have described acquiring the QR code from a web page, QR codes may also be obtained from a camera application of the client device 310. The client security module may detect that a QR code is in the camera viewport, identify the QR code, and replace the QR code image in the real world imagery, via an augmented reality (AR) image, with something that indicates there is a QR code within the viewport. This may prevent the AR content merge layer from automatically reading the QR code and fetching the (possibly inappropriate or malicious) content. The security module may then give the user the option to access the QR code, or send the QR code to the PCP engine to determine if the QR code is malicious. This allows the user to "observe" the QR code, without automatically "scanning" the QR code, where the latter refers to an intent to find the QR code and retrieve the content associated with QR code's encoded URL.

While the embodiments have been described with regards to particular embodiments, it is recognized that additional variations may be devised without departing from the inventive concept. The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A method comprising:
receiving, by a security module executing on a client device, a request for web content;
taking, by the security module, a snapshot of the requested web content by loading the requested web content and generating an image of the requested web content at a predetermined resolution;
scanning, by a computer vision model, the snapshot of the requested web content to identify and annotate graphical features prior to rendering the web content on a display of the client device;

identifying, by the computer vision model, a quick-response (QR) code among the annotated graphical features;
extracting, by the security module, information encoded within the identified QR code;
transmitting, by the client device, the information encoded within the identified QR code to a phishing and content protection (PCP) engine;
receiving, from the PCP engine, an indication whether or not the information encoded within the identified QR code is malicious; and
rendering a modified version of the web content, when the identified QR code is indicated to be malicious by the server executing the PCP engine, by modifying the rendered web content to discourage a user from taking an action based on the information encoded within the identified QR code, the modifying including providing a link to a web site with a notification message that the identified QR code is likely to be malicious.

2. The method of claim 1, wherein the indication whether or not the information encoded within the identified QR code is malicious is determined by the PCP engine comparing the identified QR code to a database of known malicious network-based end points and transmitting an indication that the identified QR code is malicious when the information encoded within the identified QR code matches an entry in the database of known malicious network-based end points.

3. The method of claim 1, the web content being a web page.

4. The method of claim 1, the modifying further comprising blocking access to the requested web page.

5. The method of claim 1, the web content being an e-mail message.

6. The method of claim 1, further comprising:
identifying by the computer vision model, a hyperlink on the web content;
transmitting, by the client device, the identified hyperlink to the server executing the PCP engine via the network connection prior to rendering the identified hyperlink on a display of the client device;
receiving, by the client device from the server executing the PCP engine via the network connection, an indication that the identified hyperlink has a likelihood of linking to malicious content; and
replacing the identified hyperlink with an unselectable indicator stating that there is a potential security problem with the identified hyperlink.

7. The method of claim 1, the modifying further comprising overlaying a different graphic over the identified QR code to prevent the identified QR code from being scannable.

8. The method of claim 1, further comprising, in response to the transmitting the information encoded within the identified QR code to the server executing the PCP engine, displaying an indicator on the requested web content that the QR code is currently being resolved by the PCP engine and that the user refrain from taking an action based on the information encoded within the identified QR code until a response is provided by the PCP engine.

9. The method of claim 8, further comprising blurring the identified QR code until the response is provided by the PCP engine.

10. A method comprising:
receiving, by a security module executing on a client device, a request for web content;
taking, by the security module, a snapshot of the requested web content by loading the requested web content and generating an image of the requested web content at a predetermined resolution;
scanning, by a computer vision model executing on the client device, the snapshot of the requested web page to identify and annotate graphical features prior to rendering the web content on a display of the client device, at least one of the annotated graphical features being a quick-response (QR) code;
extracting, by the security module, information encoded within the identified QR code;
transmitting, by the client device, the information encoded within the identified QR code and identifiers of the annotated graphical features to a phishing and content protection (PCP) engine;
determining, by the PCP engine, reputation values of each annotated feature of the requested web content, including the QR code, the PCP engine including a scoring model trained using training web content data and further outputting a reputation score for received web content based on determined reputation values of each identified feature on the received web content; and
rendering the requested web content, where the rendered web content is modified to discourage a user from scanning the identified QR code when the determined reputation value of the information encoded within the QR code is less than a predetermined reputation threshold, the modifying including providing a link to a web site with a notification message that the identified QR code is likely to be malicious.

11. The method of claim 10, further comprising rating, by the PCP engine, the requested web content based on the reputation values of each annotated feature of the requested web content, and providing, by the client device, the rating of the requested web content to a user of the client device.

12. The method of claim 10, the rendered web content being further modified by rendering the QR code with an indication that the QR code is a security risk and preventing the QR code from being scannable.

13. The method of claim 10, further comprising modifying, by the client device, any annotated features having a determined reputation value that is less than the predetermined reputation threshold on the rendered web content, the modifying comprising rendering the annotated feature having the determined reputation value less than the predetermined reputation threshold with an indication that the annotated feature is a security risk and preventing the annotated feature from being selectable.

14. The method of claim 10, further comprising:
receiving, by the client device from the server executing the PCP engine via the network connection, an indication whether or not the identified QR code is malicious; and
modifying, by the client device, the identified QR code to be scannable in response to the PCP engine indicating that the identified QR code is not malicious.

15. The method of claim 14, the transmitting the information encoded within the identified QR code to the server executing the PCP engine being done in response to a determination by the computer vision model that the reputation value associated with the identified QR code is in a predetermined range of scores where it is unclear if the identified QR code is malicious.

16. Method comprising:
receiving, by a server receiving, by a security module executing on a client device, a request for web content;
taking, by the security module, a snapshot of the requested web content by loading the requested web content and generating an image of the requested web content at a predetermined resolution;

scanning, by a computer vision model executing on the client device, the snapshot of the requested web content to identify and annotate graphical features on the web content prior to rendering the web content on a display of the client device, the computer vision model having been trained using training web page data and outputting a reputation score for received web content based on determined reputation values of each identified feature on the received web content;

extracting, by the security module, information encoded within the identified QR code;

transmitting, by the client device, the information encoded within the identified QR code and identifiers of the annotated graphical features to a phishing and content protection (PCP) engine;

rating, by the PCP engine, the requested web content with an overall reputation rating based on a semantic comparison of the annotated features with reference versions of the annotated features used to generate the reputation values of each annotated feature;

providing, by the client device, the rating of the requested web content to a user of the client device subsequently scanning, by the computer vision model, the requested web content in response to a subsequent request for the web content by the client device, the requested web content including a new quick-response (QR) code at the time of the subsequent request;

determining, by the PCP engine, that information encoded within the new QR code has a reputation value that is less than a predetermined reputation threshold;

reducing, by the client device, the overall reputation rating of the requested web content based on the determination that the information encoded within the new QR code has a reputation value that is less than the predetermined reputation threshold.

17. The method of claim 16, wherein reputation values for each annotated feature are determined by semantic comparison of each annotated feature to a reference version of the annotated feature, the reference version being obtained by the PCP engine from a previous version of the web content.

18. The method of claim 16, further comprising modifying, by the client device, the new QR code to not be scannable when rendering the requested web content on a display of the client device.

19. The method of claim 16, further comprising:

detecting, by the client device, an attempt by an application to forward an address of the requested web content to an external destination after determining that the information encoded within the new QR code has a reputation value less than the predetermined reputation threshold; and generating, by the client device, a message for display on the client device stating that the requested web content includes malicious material.

20. The method of claim 19, further comprising preventing, by the client device, any forwarding of the address of the requested web content.

* * * * *